(12) United States Patent
Supalov (10) Patent No.: US 7,539,995 B2
(45) Date of Patent: May 26, 2009

(54) METHOD AND APPARATUS FOR MANAGING AN EVENT PROCESSING SYSTEM

(75) Inventor: Alexander Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 11/027,627

(22) Filed: Dec. 30, 2004

(65) Prior Publication Data

US 2006/0156312 A1    Jul. 13, 2006

(51) Int. Cl.
*G06F 13/00* (2006.01)
(52) U.S. Cl. .................. 719/313; 719/314; 719/318
(58) Field of Classification Search .................. 719/313, 719/314, 318
See application file for complete search history.

(56) References Cited

U.S. PATENT DOCUMENTS 6,415,332 B1 * 7/2002 Tuel, Jr. ..................... 719/313
6,954,933 B2 * 10/2005 Stall ........................... 719/314
2002/0095471 A1 * 7/2002 Maciel ........................ 709/212
2005/0080841 A1 * 4/2005 Balazich et al. ............. 709/200
2006/0095535 A1 * 5/2006 Govindaraju et al. ....... 709/217

* cited by examiner

*Primary Examiner*—Andy Ho
(74) *Attorney, Agent, or Firm*—Marshall, Gerstein & Borun LLP (57) ABSTRACT

An event processing system for managing incoming messages from multiple fabrics to an application includes a master event processing device and a subordinate event processing device, with the subordinate event processing device having an additional data entry in the master event processing device, the additional data entry corresponding to a request for incoming messages at the subordinate event processing device. Upon detecting an incoming message corresponding to the additional data entry, the subordinate event processing device sends a request to the master event processing device for permission to process the incoming message and the subordinate event processing device processes the incoming message only when the permission is received from the master event processing device. The event processing system allows efficient processing of the incoming messages from multiple fabrics while ensuring order and progress in processing of the incoming messages.

17 Claims, 6 Drawing Sheets

FIG. 6 ively processes incoming messages from multiple fabrics, while meeting the MPI requirements of ordering and progress among the multiple fabrics and retaining the latency and bandwidth of the message passing as much unaffected as possible.

METHOD AND APPARATUS FOR MANAGING AN EVENT PROCESSING SYSTEM

TECHNICAL FIELD

This patent relates generally to computer processors and more particularly to message passing interface of a computer processor.

BACKGROUND

Modern day computer systems often process a number of computer applications, each having a number of processes. Each of such processes requires a number of resources including memory, input/output devices, microprocessor time, etc. Due to the high number of processes and the limited amount of available resources, often it is necessary that a number of programs are run simultaneously, which is known as parallel processing.

In parallel processing mode each of the various parallel programs consist of co-operating processes, each process having its own memory. These processes send data to each another in the form of messages, with each message having a tag that may be used to sort the messages. A common approach to parallel programming is to use a message passing library, where a process uses the library calls to exchange messages (information) with another process. Such message passing allows processes running on multiple processors to cooperate with each other.

Every time a message is received by a device, it generates and event for that device. For example, a central processing unit (CPU) of a computer may receive messages from a keyboard, a mouse, a modem, a process running on a math processor, etc. Each message generates an event for the CPU and the CPU processes these events according to an event processing algorithm/system. In general, various devices often use a special type of event processing system for managing various messages.

As a number of different applications provided by a number of different vendors may be running together in a parallel mode operation, it is necessary that such different processes communicate with each other. To ensure such communication between various processes, a standard known as message passing interface (MPI), defined by a group of organizations including various vendors and researchers is used. Generally speaking, an MPI is an interface designed to allow a user to code data such that processors in a network can send and receive data and information. MPI is available on a wide variety of platforms ranging from massively parallel systems (Cray T3D, Intel Paragon, etc.) to networks of workstations (Sun4, etc.). Most of the commonly used MPI systems operate according to an MPI standard, which specifies point to point communication in the form of various send and receive calls from multiple fabrics to one or more applications.

One of the problems encountered by an MPI implementation that has to drive several communication fabrics at once (e.g., shared memory and some network(s)) is the so called "multi-fabric MPI_ANY_PROCESS receive operation". This term refers to a very common situation when any fabric can serve as a source of an incoming message. It occurs every time when the wildcard MPI_ANY_SOURCE is used as the rank of the source process in operations MPI_Recv and MPI_Irecv, and the respective MPI communicator spans several fabrics.

According to the MPI standard, the MPI implementation has to ensure at any time that the messages delivered from any one source MPI process to this destination process remain ordered within communicator and tag scope (ordering requirement), and that any fabric can make progress on the respective messages despite any blocking possibly experienced by other fabrics (progress requirement). Achieving these goals in a multi-fabric case would be simple if at the same time it were not imperative to retain the latency and bandwidth of the message passing as much unaffected as possible.

There are at least two known methods that try to solve this problem. According to one method, one can poll all fabrics according to a certain strategy that ensures progress. In this case the polling operations must not block, and thus cannot use potentially more efficient and less CPU intensive waiting mechanisms. In addition to this, some adaptive polling scheme is to be introduced in order to accommodate possible differences in the typical latencies of the respective fabrics.

According to a second method, one can ask all fabrics to watch for a certain message, and then let the fabric that detects a matching message first to proceed with the receive operation. In this case, one has to cancel (potentially partially completed) receive requests in all other fabrics, which may or may not be possible. Note also that in the latter case, some mutual exclusion scheme must be introduced if the respective fabrics are to be allowed to deliver data directly to the application memory.

To address the above problems, it is desirable to provide a more efficient MPI system that efficiently processes incoming messages from multiple fabrics, while meeting the MPI requirements of ordering and progress among the multiple fabrics and retaining the latency and bandwidth of the message passing as much unaffected as possible.

BRIEF DESCRIPTION OF THE DRAWINGS

The present patent is illustrated by way of examples and not limitations in the accompanying figures, in which like references indicate similar elements, and in which.

DETAILED DESCRIPTION OF THE EXAMPLES

In the following detailed description of numerous different embodiments, reference is made to the accompanying drawings which form a part hereof, and in which is shown, by way of illustration, specific embodiments by which the present patent may be implemented. In the drawings, like numerals describe substantially similar components throughout the several views. These embodiments are described in sufficient detail to enable those skilled in the art to practice the present patent. Other embodiments may be utilized and structural, logical and electrical changes may be made without departing from the scope of the present patent. The following detailed description is therefore, not to be taken in a limiting sense and the scope of the present patent is defined only by the appended claims, along with the full scope of equivalents to which such claims are entitled.

An event processing system for managing incoming messages from multiple fabrics to an application includes a master event processing device and a subordinate event processing device, with the subordinate event processing device having an additional data entry in the master event processing device, the additional data entry corresponding to a request for incoming messages at the subordinate event processing device. Upon detecting an incoming message corresponding to the additional data entry, the subordinate event processing device sends a request to the master event processing device for permission to process the incoming message and the subordinate event processing device processes the incoming message only when the permission is received from the master event processing device. The event processing system allows efficient processing of the incoming messages from multiple fabrics while ensuring order and progress in processing of the incoming messages.

In an implementation of the event processing system, a message passing interface (MPI) system for managing incoming messages from multiple fabrics to an application includes a master (MPI) device and a subordinate MPI device, with the subordinate MPI device having an additional data entry in the master MPI device, the additional data entry corresponding to a request for incoming messages at the subordinate MPI device. Upon detecting an incoming message corresponding to the additional data entry, the subordinate MPI device sends a request to the master MPI device for permission to process the incoming message and the subordinate MPI device processes the incoming message only when the permission is received from the master MPI device. The MPI system allows efficient processing of the incoming messages from multiple fabrics while ensuring order and progress in processing of the incoming messages.

An alternate embodiment of the event processing system includes a master MPI device adapted to communicate with an application and to manage a first fabric of incoming messages, wherein the master MPI passing device adapted to store a data entry corresponding to a request for incoming message received at a subordinate MPI device and to receive a request for a permission from the subordinate MPI device to receive an incoming message corresponding to the data entry. Furthermore, the subordinate MPI device is adapted to communicate with the application and to manage a second fabric of incoming messages, the subordinate MPI device further adapted to send the request for the permission to the master MPI device to receive the incoming message corresponding to the data entry.

A Network

Figure 1:
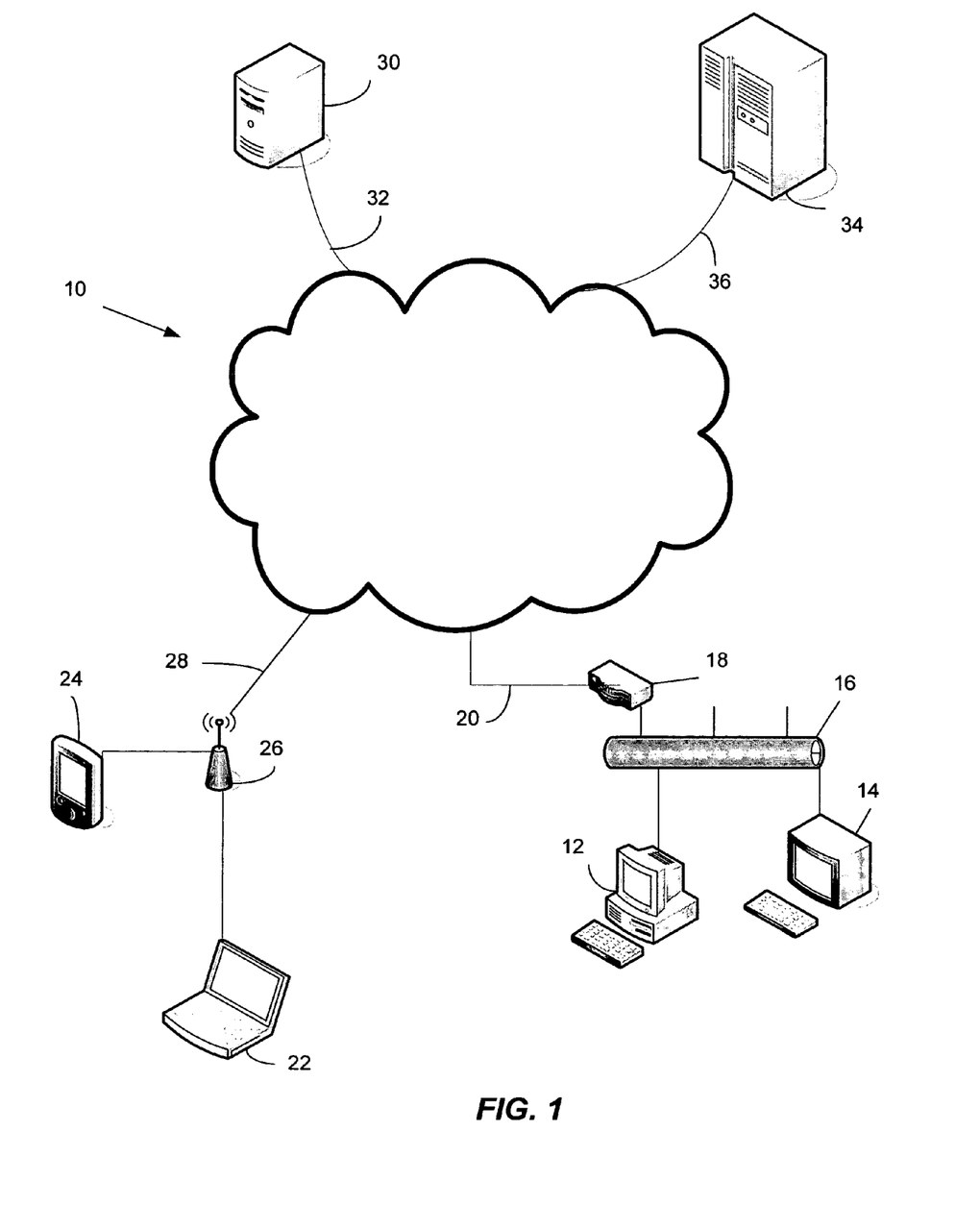
FIG. 1 illustrates a block diagram of a network that may use an event processing system.

FIG. 1 illustrates a network 10 that may be used to implement a message passing interface (MPI) system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the dynamic software provisioning system may be stored and operated on any of the various devices connected to the network 10.

A Computer

Figure 2:
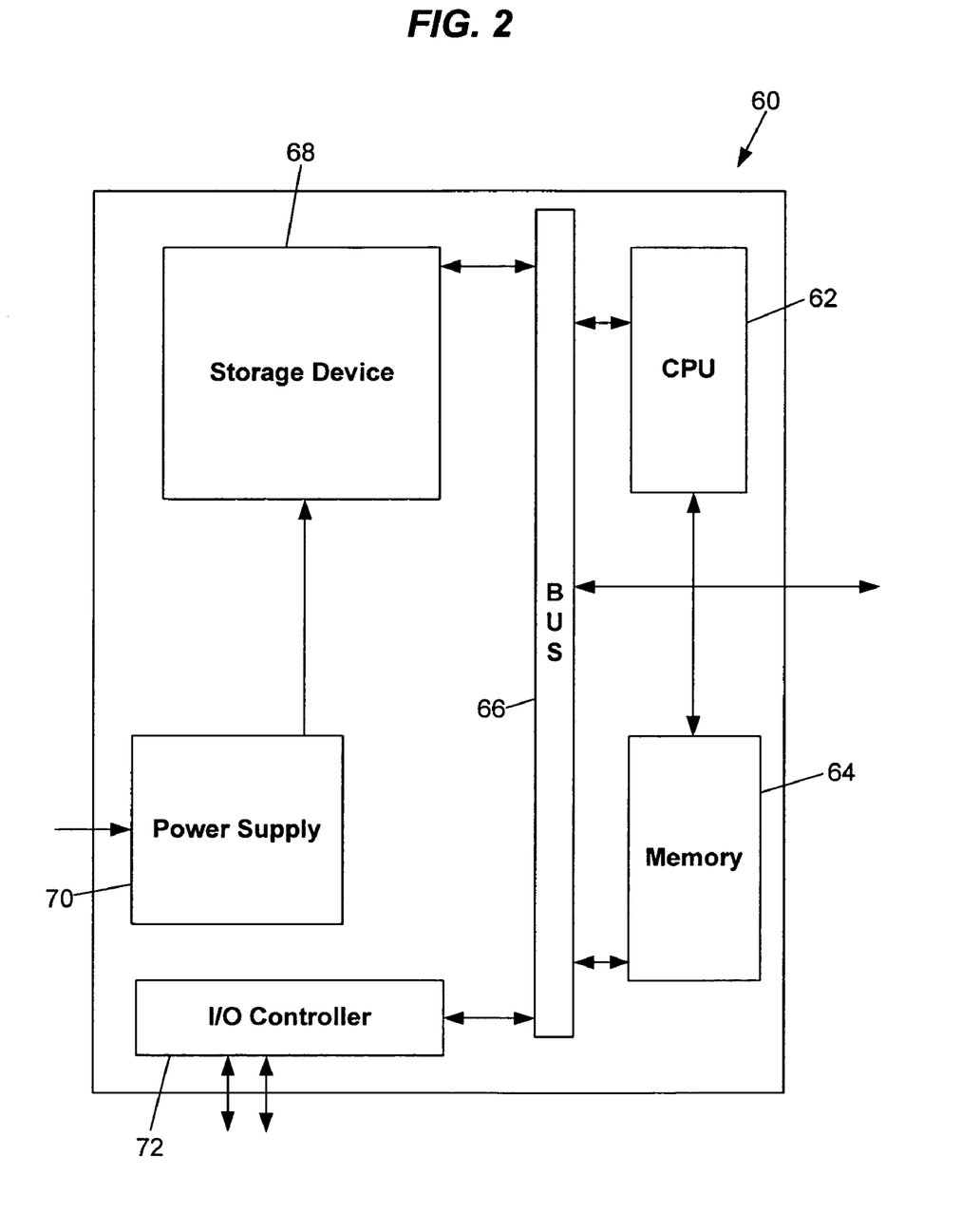
FIG. 2 illustrates a block diagram of an exemplary computer that may be used with the network of FIG. 1.

FIG. 2 illustrates a block diagram of an example computing device 60 that may be used to implement the MPI system. As used herein, the term "computing device" refers to any type of computing device, e.g., a portable computer, a laptop computer, a PDA, a desktop computer, a server, a network switch, a router, etc. Additionally, the computing device 60 may or may not be used as a node on a computer network 10. The computer 60 of FIG. 2 includes many conventional hardware components commonly used in computers. In particular, the computer 60 includes a central processing unit (CPU) 62, a memory 64, an internal communications bus 66, a storage device 68, a power supply 70 and an input/output (I/O) controller 72. Even though the computer 60 illustrated in FIG. 2 shows these components internal to the computer 60, a person of ordinary skill in the art will appreciate that some of these components can be external to the computer 60.

The computer 60, when used as the host system 14, may be connected to the communication network 10 via the internal communication bus 66. The storage device 68 and/or the memory 24 may be used to store various applications as well as to store data used by such applications. The memory 64 may include random access memory (RAM) and/or read only memory (ROM). The CPU 62 may include one or more registers, buffers, internal clock as well as other devices well known to those of ordinary skill in the art.

An event processing system may be implemented in the computing device 60 at one or more locations to facilitate communication between various components of the computing device 60, or to facilitate communication between the computing device 60 and the network 10. For example, communications between the internal communication bus 66 and one or more external communication devices may be implemented using an event processing system. Similarly, communication from the CPU 62, the storage device 68, the I/O controller 72, etc., to the internal communication bus 66 may also be facilitated by an MPI system.

Event Processing System

Figure 3:
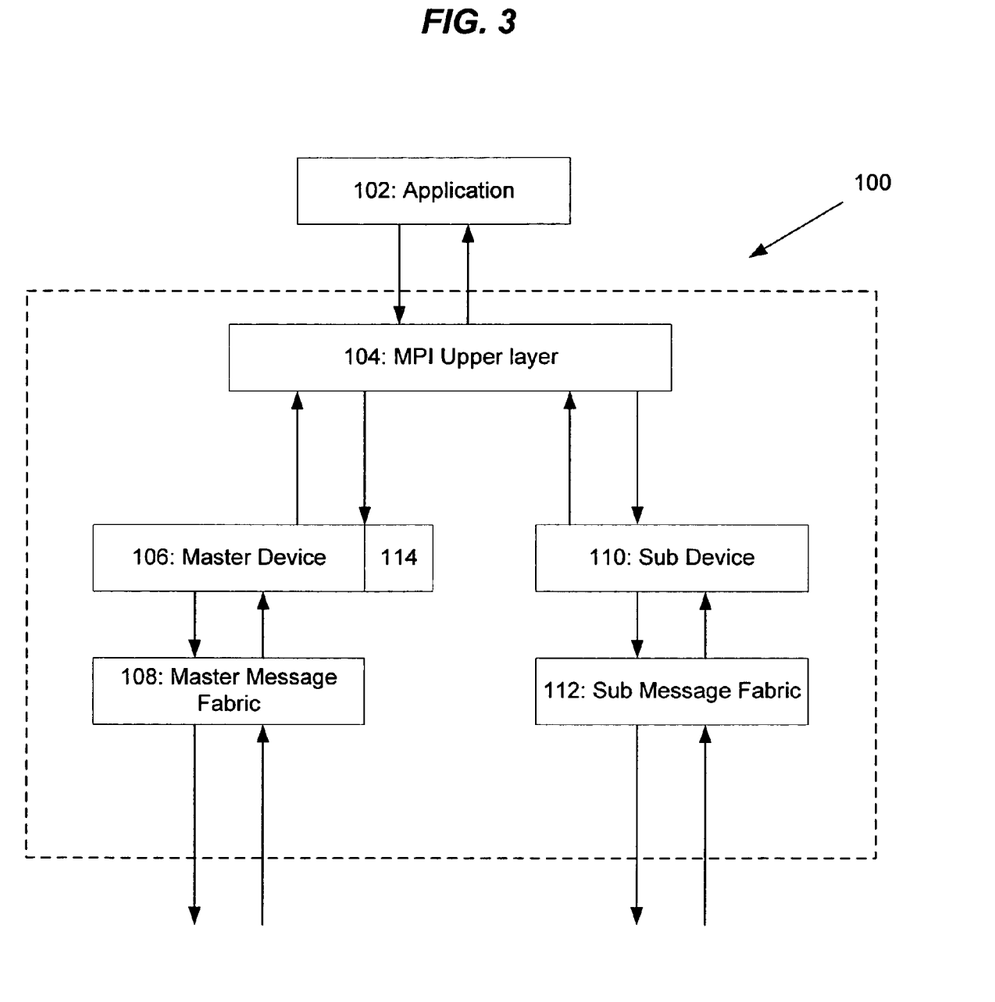
FIG. 3 illustrates a block diagram of an event processing system that may be used with the computer of FIG. 2.

FIG. 3 illustrates a block diagram of an MPI system 100, which may be an example of an event processing system that may be used by the computing device 60 or by any other device on the network 10. The MPI system 100 may be implemented in a number of different locations, including registers of the CPU 62, on random access memory portion of the memory 64, on the storage device 68, etc. The MPI system 100 may be used to communicate messages to and from an application 102, where the application 102 may be an application running on the CPU 62, an application running on the internal communication bus 66, a resource on the storage device 68, an application running on a router on the network 10, etc.

The implementation of the MPI system 100 includes an MPI upper layer 104, a master MPI device 106 communicating with a master message fabric 108 and a sub MPI device 110 communicating with a sub message fabric 112. Each of the MPI upper layer 104, the master MPI device 106 and the sub MPI device 110 may be designed using registers, RAM, programmable ROM, a combination of one or more of such means or in a similar manner. The master message fabric 108 and the sub message fabric 112 may be designed using RAM or any other type of memory or storage device.

For example, the MPI upper layer 104 may be a collection of registers and a logic stored on a programmable ROM on the internal communication bus 66 such that the registers are used to receive and store information, the programmable ROM is designed to process the information in the registers and/or to take decisions based on the information in the registers. In the illustrated implementation of the MPI system 100, the MPI upper layer 104 may be used to communicate with the master MPI device 106, the sub MPI device 110 and the application 102. Additionally, both the master MPI device 106 and the sub MPI device 110 facilitate communication to the MPI upper layer 104 and from the MPI upper layer 104.

Each of the master MPI device 106 and the sub MPI device 110 may also be designed using one or more registers and operational logic used to manage the information stored in the registers. The master MPI device 106 may attend to the master message fabric 108 by storing entries related to various message requests received from the master message fabric 108. In doing so, the master MPI device 106 may store data entries related to various message requests received from the master message fabric 108 and process the message requests in accordance with the MPI standards, or in any other desired standard. Similarly, the sub MPI device 110 may attend to the sub message fabric 112 by storing entries related to various message requests received in the sub message fabric 112. In doing so, the sub message device 110 may store data entries related to various message requests received from the sub message fabric 112 and process the message requests in accordance with the MPI standards, or in any other desired manner.

The implementation of the MPI system 100 may also be designed so that the master MPI device 106 may have extra data entries related to the message requests from the sub message fabric 112. Thus, the master MPI device 106 may have data entries related to the master message fabric 108 and data entries related to the sub message fabric 112. On the other hand the sub MPI device 110 may have data entries related to only the sub message fabric 112. The functioning of the master MPI device 106 and the sub MPI device 110 are illustrated in further detail in FIGS. 4 and 5 below.

Figure 4:
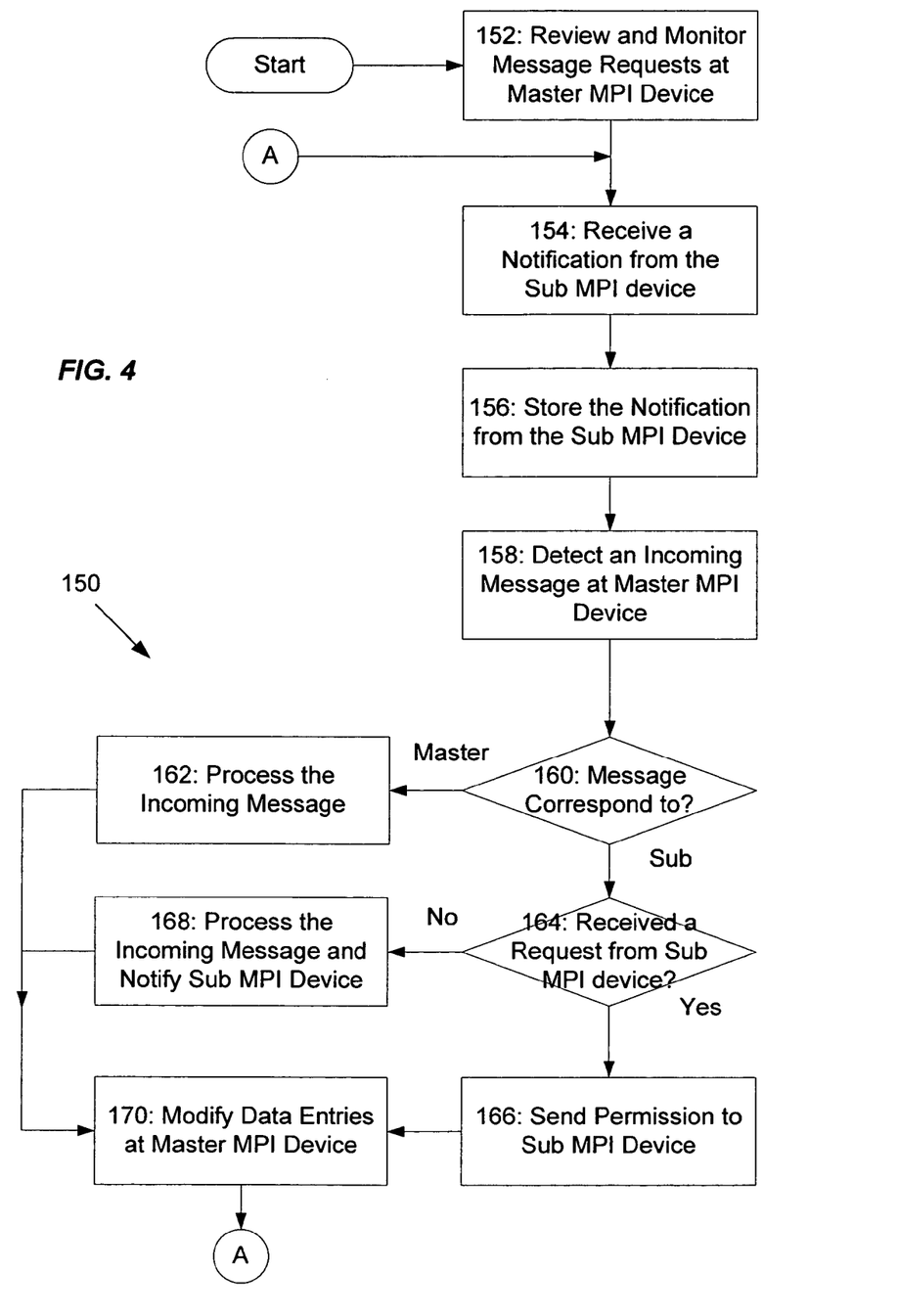
FIG. 4 is a flowchart of a master event processing program that may be used by the event processing system of FIG. 3.

FIG. 4 illustrates a flowchart of a master MPI program 150 used by the master MPI device 106. The master MPI program 150 may be in the form of software stored in memory or in the form of firmware working with the master MPI device 106. At a block 152, the master MPI program 150 reviews and monitors data entries for message requests stored at the master MPI device 106. The master MPI device 106 and the sub MPI device 110 may have one or more data entries related to requests for messages from the master message fabric 108 and the sub message fabric 112, respectively.

For example, when a message request is received from the master message fabric 108, a data entry may be made into the master MPI device 106. Such data entry may include various information describing the characteristics of the received message request, including its priority, type of message, etc. Similarly, when a message request is received in the sub message fabric 112, a data entry may be made into the master MPI device 110, where such data entry may include various information describing the characteristics of the received message request, including its priority, type of message, etc.

Moreover, in the implementation of the MPI system 100, when a message request is received in the sub message fabric 112, a data entry may also be made into the master MPI device 110. This is described in the FIG. 3 by a sub message entries section 114 within the master MPI device 106. Thus, as discussed above, the master MPI device 106 may have data entries for the message requests from the master message fabric 108 as well as for the message requests from the sub message fabric 112.

When the master MPI program 150 reviews the data entries for various messages stored at the master MPI device 106, it is possible that there are one or more data entries related to messages in the master message fabric 108 and the sub message fabric 112. However, it is not necessary that there are one or more such data entries, i.e., it is possible that all the messages in the master message fabric 108 and the sub message fabric 112 are already attended to, and therefore, the master MPI device 106 may have no data entries related to message requests. Moreover, at the block 152 continuously monitors all the entries in the master MPI device 108.

In an implementation, the sub MPI device 110 may be implemented to generate a notification to the master MPI device 106 upon storing of a data entry into the sub MPI device 110. In yet another implementation, the sub MPI 110 may be implemented with logic that determines if it is necessary to make an entry into the master MPI device 106 for a data entry into the sub MPI device 110. Such implementations are illustrated by the flow of control in the master MPI program 150, where at a bock 154, the master MPI device 106 may receive such notification from the sub MPI device 110. In such an implementation, at a block 156, the master MPI program 150 may store the notification received from the sub MPI device 110 into the sub message entries section 114 of the master MPI device 106.

Even though in the given implementation of the master MPI program 150, the master MPI device 106 is shown to have only one sub message entries section 114, in an alternate implementation, the master MPI device 106 may have a number of sub message entries sections, each corresponding to one of multiple sub message fabrics.

Subsequently, at a block 158, the master MPI program 150 may detect an incoming message and in response to detection of the incoming message, at a block 160, the master MPI device 106 may review the various data entries made into the master MPI device 106 and into the sub message entries section 114 to determine if the incoming message corresponds to the master message fabric 108 or to the sub message fabric 112.

If the incoming message corresponds to the master message fabric 108, at a block 162, the master MPI program 150 processes the incoming message according to any logic of the master MPI device 106. However, if it is determined that the incoming message corresponds to a data entry into the sub message entries section 114, i.e., that incoming message corresponds to the sub message fabric 112, at a block 164, the master MPI device 106 determines if it has received any request from the sub MPI device 110 requesting a permission to process that particular incoming message by the sub message device 110.

If the master MPI device 106 has received such a request from the sub MPI device 110, at a block 166, the master MPI device 106 sends a permission to the sub MPI device 110 to process that particular incoming message.

If the block 164 determines that the master MPI device 106 has not received a request from the sub MPI device 110 to process the incoming message, at a block 168, the master MPI device 106 may process the incoming message. After processing the incoming message the master MPI device may also notify the sub MPI device 110 that the incoming message has been processed by the master MPI device 106. In response to such a notification, the sub MPI device 110 may remove a data entry from the sub MPI device 110 corresponding to that particular incoming message. The processing done at the sub MPI device 110 is discussed in further detail with respect to FIG. 5 below.

After sending a request to the sub MPI device 110 to process the incoming message or after processing the incoming message, at a block 170, the master MPI device 106 may modify the data entries at the master MPI device 106 as necessary. This may include deleting a data entry related to the master message fabric 108 or deleting a data entry in the sub message entries section 114 corresponding to a request from the sub MPI device 110.

Figure 5:
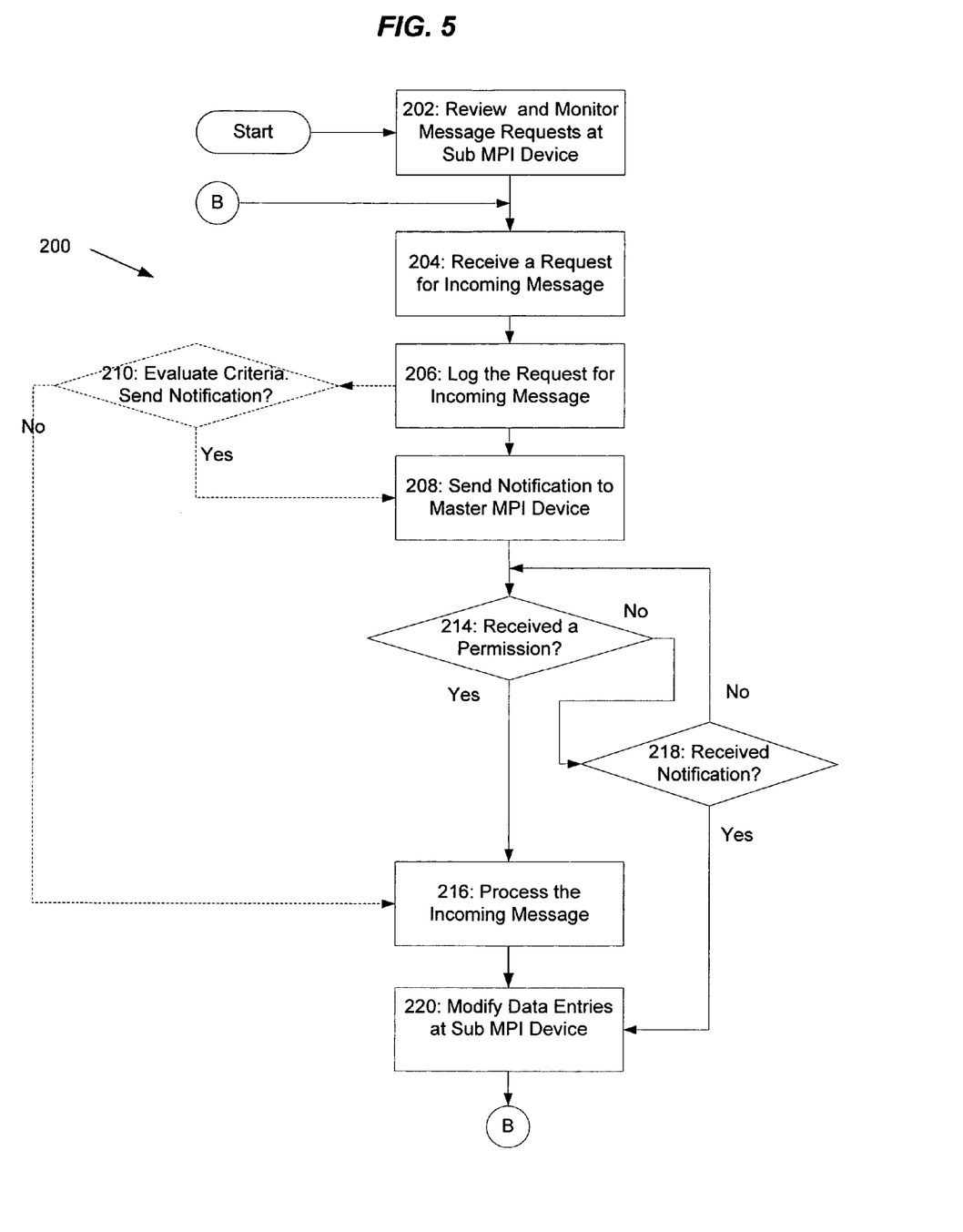
FIG. 5 is a flowchart of a subordinate event processing program that may be used by the event processing system of FIG. 3.

Now referring to FIG. 5, a flowchart illustrates a sub MPI program 200 used by the sub MPI device 110 to process various message requests received at the sub message fabric 112. At a block 202, the sub MPI program 200 reviews and monitors data entries for message requests stored at the sub MPI device 110. The sub MPI device 110 may have one or more data entries related to requests for messages from the sub message fabric 112.

Subsequently, at a block 204, the sub MPI program 200 may receive a request for an incoming message from the sub message fabric 112. In response to the request, at a block 206, the sub MPI program 200 may log in a data entry corresponding to that particular request for an incoming message into the sub MPI device 110.

Moreover, at a block 208, the sub MPI program 200 may also send a notification of the request for an incoming message to the master MPI device 106. In an implementation of the sub MPI program 200, the sub MPI device 110 may use one or more criteria to determine if it should send a notification of the request for an incoming message request to the master MPI device 106. For example, one such criterion may be the number of data entries in the sub MPI device 110, etc. Such an alternate implementation is illustrated by a block 210 where the sub MPI device 110 uses a criterion to determine if a notification needs to be sent to the master MPI device 106. The processing of such a notification at the master MPI device 106 is discussed above with respect to FIG. 4.

Subsequently, at a block 214, the sub MPI device 110 may determine if it has received a permission from the master MPI device 106 to process the incoming message. If such a permission is received, at a block 216, the sub MPI device 210 may process the incoming message. However, if such a permission is not received from the master MPI device 106, at a block 218, the sub MPI device 110 may determine if a notification is received from the master MPI device 106 that the incoming message has been processed by the master MPI device 106. Note that while the sub MPI device 110 waits for a notification from the master MPI device 106, it may continue monitoring incoming messages. In an alternate implementation, the sub MPI device 110 may wait only for a predetermined amount of time for a notification from the master MPI device 106, after which it may resume its operation of monitoring incoming messages.

After processing the incoming message at the block 216 or after determining that a notification is received from the master MPI device 106 that the incoming message has been processed, at a block 220, the sub MPI device 110 may perform the necessary modifications to the data entries at the sub MPI device 110. For example, at the block 220, the sub MPI device 110 may delete data entries related to a request for a message where such a request corresponds to the incoming message that has been processed.

Figure 6:
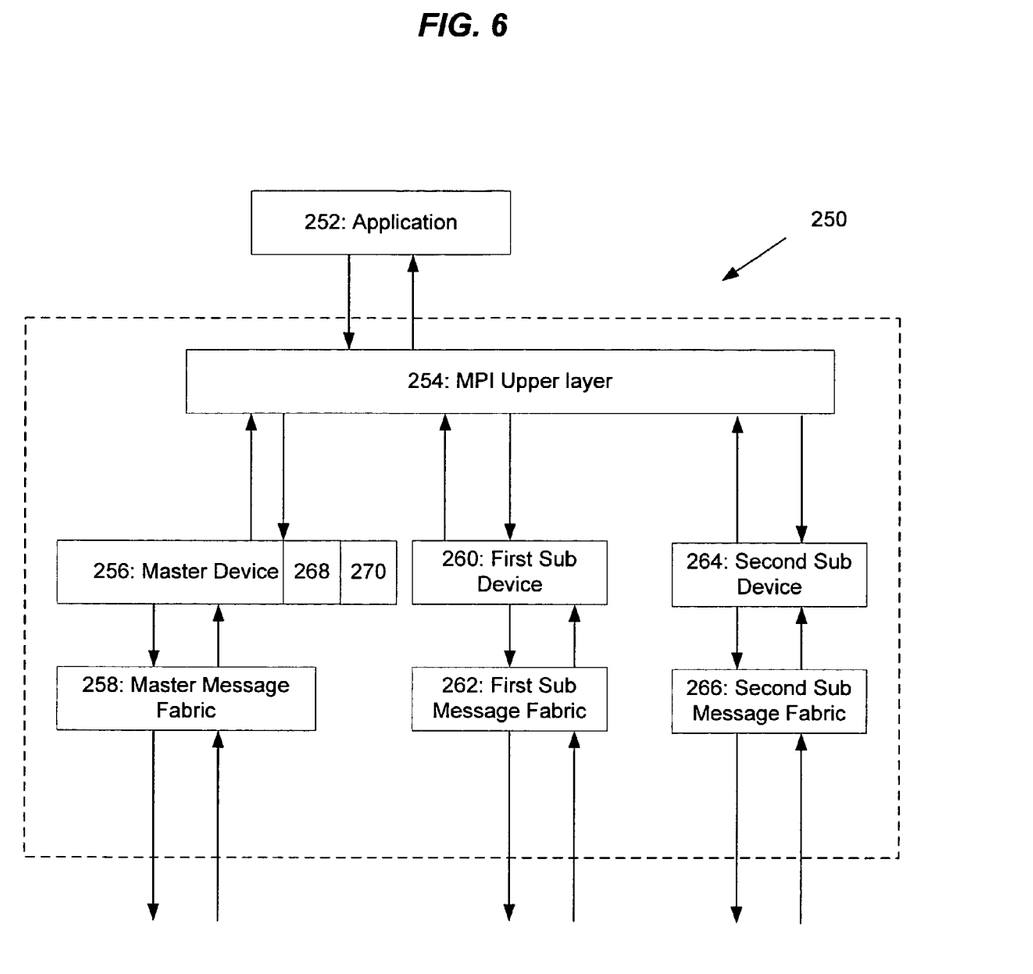
FIG. 6 illustrates a block diagram of an alternate event processing system that may be used with the computer of FIG. 2.

Note that the implementation of the MPI system 100 illustrated in FIG. 3 includes only two MPI devices, namely one master MPI device 106 and one sub MPI device 110. However, one of ordinary skill in the art can appreciate that in an alternate implementation, an MPI system may include a number of additional MPI devices. For example, FIG. 6 illustrates an implementation of an alternate MPI system 250, working with an application 252 and including an MPI upper layer 254. The alternate MPI system 250 may have one master MPI device 256 attending to a master message fabric 258, a first sub MPI devices 260 attending to a first sub message fabric 262 and a second sub MPI device 264 attending to a second sub message fabric 266.

In the alternate MPI system 250, the master MPI device 256 may have a first sub data entries section 268 corresponding to data entries of the first sub MPI device 260 and a second sub data entries section 270 corresponding to the data entries of the second sub MPI device 264. The functioning of the alternate MPI system 250 is in many respects similar to the functioning of the MPI system 100, in that the master MPI device 256 may process messages from the master message fabric 258 and the sub message fabrics 262 and 266. One of ordinary skill in the art would appreciate that when processing a message from one of the sub message fabric 262 or 266, the master MPI device 256 will communicate with the sub MPI devices 260 and 264 as necessary. Similarly, each of the sub MPI devices 260 and 264 will communicate with the master MPI device 256 when processing messages from the sub message fabrics 262 and 266.

While the above implementations of the MPI systems 100 and the MPI system 250 illustrate two of various possible implementations of an event processing system, one of ordinary skill in the art would appreciate that a number of other alternate implementations of the MPI system 100 may be devised for processing events in a network and/or a computing device. For example, in an alternate implementation, a number of master MPI devices and sub MPI devices may be nested hierarchically, with an appropriate event processing protocol being used to operate such a hierarchical structure. For example, in such a hierarchical implementation of an MPI system, first MPI layer may have a master MPI device and a sub MPI device, wherein the master MPI device may be receiving messages from a second MPI layer and the sub MPI device may be receiving messages from a third MPI layer. Moreover, each of such second, third or additional layers may have a master MPI device or a sub MPI device that may be added dynamically as needed by message load on the existing MPI devices.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims of this patent.

Thus, many modifications and variations may be made in the techniques and structures described and illustrated herein without departing from the spirit and scope of the present patent. Accordingly, it should be understood that the methods and apparatus described herein are illustrative only and are not limiting upon the scope of the patent.

What is claimed is:

1. A method of passing messages to an application using a first message passing device attending to a first message fabric and a second message passing device attending to a second message fabric, the first message passing device having a first list of previously received message requests at the first message passing device and the second message passing device having a second list of previously received message requests at the second message passing device, the method comprising:
   receiving a request for incoming message at the second message passing device;
   adding the request for incoming message in the second list;
   notifying the first message passing device of the request for incoming message;
   modifying the first list to add the request for incoming message;
   detecting at the second message passing device a pending message corresponding to the request for incoming message;
   sending a message processing request from the second message processing device to the first message processing device; and
   processing the pending message when a permission to process the pending message is received from the first message passing device.

2. A method of passing messages to an application using a first message passing device attending to a first message fabric and a second message passing device attending to a second message fabric, the first message passing device having a first list of previously received message requests at the first message passing device and the second message passing device having a second list of previously received message requests at the second message passing device, the method comprising:
   receiving a request for incoming message at the second message passing device;
   adding the request for incoming message in the second list;
   notifying the first message passing device of the request for incoming message;
   modifying the first list to add the request for incoming message;
   detecting at the first message passing device a first pending message corresponding to the request for incoming message;
   determining if the first message passing device has received a message processing request from the second message passing device to process the first pending message;
   sending a permission to the second message passing device to process the first pending message if a message processing request has been received; and
   processing the first pending message according to a first message processing rule of the first message passing device if a message processing request has not been received.

3. A method of claim 2, further comprising:
   sending a notification from the first message passing device to the second message passing device of the processing of the first pending message according to a first message processing rule; and
   modifying the first list of previously received message requests.

4. A method of claim 3, further comprising receiving at the second message passing device the notification from the first message passing device and modifying the second list of previously received message requests.

5. A method of claim 2, further comprising passing the first pending message directly from the first message passing device to the application.

6. A method of claim 2, further comprising passing a second pending message directly from the second message passing device to the application.

7. A method of claim 2, further comprising:
   receiving a second request for incoming message at a third message passing device, wherein the third message passing device attending to a third message fabric and having a third list of previously received message requests at the first message passing device;
   adding the second request for incoming message in the third list;
   notifying the first message passing device of the second request for incoming message; and
   modifying the first list to add the second request for incoming message.

8. A method of claim 6, further comprising:
   detecting at the third message passing device a second pending message corresponding to the second request for incoming message;
   sending a message processing request from the third message processing device to the first message processing device; and
   processing the second pending message when a permission to process the second pending message is received from the first message passing device.

9. A method of claim 2 further comprising:
   evaluating the second list according to a first criterion;
   notifying the first message passing device of the request for incoming message if the first criterion is met; and
   modifying the first list to add the request for incoming message if the first criterion is not met.

10. A method of claim 9, wherein the first criterion is the number of requests on the second list.

11. An event processing system, comprising:
   a master event processing device adapted to communicate with an application and to manage a first fabric of incoming messages, the master event processing device further adapted to store a data entry corresponding to a request for incoming message received at a subordinate event processing device and to receive a message processing request for a permission from the subordinate event processing device to process an incoming message corresponding to the data entry; and
   the subordinate event processing device adapted to communicate with the application and to manage a second fabric of incoming messages, the subordinate event processing device further adapted to send the request for the permission to the master event processing device to process the incoming message corresponding to the data entry.

12. The event processing system of claim 11, wherein the master event processing device and the subordinate event processing device communicates with the application via an upper message processing interface layer.

13. The event processing system of claim 11, wherein the master event processing device and the subordinate event processing device are implemented as registers.

14. An event processing system of claim 11, wherein the master event processing device is further adapted to:
   detect at the master event processing device a first pending message corresponding to the request for incoming message;
   determine if the master event processing device has received the message processing request from the subordinate event processing device to process the first pending message;
   send a permission to the subordinate event processing device to process the first pending message if the message processing request has been received; and process the first pending message according to a first message processing rule of the master event processing device if the message processing request has not been received.

15. An event processing system of claim 11, wherein the subordinate event processing device is further adapted to determine if it needs to send the request for the permission to the master event processing device based on a first criteria.

16. A network communicating with a plurality of computing devices, the plurality of computing devices comprising:
   a master MPI device adapted to communicate with an application and to manage a master fabric of incoming messages, the master MPI device further adapted to store a first data entry corresponding to a request for incoming message received at a first subordinate MPI device and to receive a request for a permission from the first subordinate MPI device to receive an incoming message corresponding to the first data entry and to process the incoming message; and
   the subordinate MPI device adapted to communicate with the application and to manage a first subordinate fabric of incoming messages, the subordinate MPI device further adapted to send the request for the permission to the master MPI device to receive the incoming message corresponding to the first data entry and to process the incoming message when a permission to process the incoming message is received from the first message passing device.

17. A network of claim 16, further comprising a second subordinate MPI device adapted to communicate with the application and to manage a second subordinate fabric of incoming messages, the second subordinate MPI device further adapted to send the request for the permission to the master MPI device to receive the incoming message corresponding to a second data entry; and
   wherein the master MPI device is further adapted to store the second data entry corresponding to a request for incoming message received at the second subordinate MPI device and to receive a request for a permission from the second subordinate MPI device to receive an incoming message corresponding to the second data entry.

* * * * *